F. O'NEILL.
METHOD OF AND APPARATUS FOR MANUFACTURING GLASS BOTTLES.
APPLICATION FILED MAY 27, 1909.

994,421.

Patented June 6, 1911.
6 SHEETS—SHEET 1.

Fig. 1.

F. O'NEILL.
METHOD OF AND APPARATUS FOR MANUFACTURING GLASS BOTTLES.
APPLICATION FILED MAY 27, 1909.

994,421.

Patented June 6, 1911.

F. O'NEILL.
METHOD OF AND APPARATUS FOR MANUFACTURING GLASS BOTTLES.
APPLICATION FILED MAY 27, 1909.

994,421.

Patented June 6, 1911.

Witnesses:

Inventor
Frank O'Neill

F. O'NEILL.
METHOD OF AND APPARATUS FOR MANUFACTURING GLASS BOTTLES.
APPLICATION FILED MAY 27, 1909.

994,421.

Patented June 6, 1911.

F. O'NEILL.
METHOD OF AND APPARATUS FOR MANUFACTURING GLASS BOTTLES.
APPLICATION FILED MAY 27, 1909.

994,421.

Patented June 6, 1911.

F. O'NEILL.
METHOD OF AND APPARATUS FOR MANUFACTURING GLASS BOTTLES.
APPLICATION FILED MAY 27, 1909.

994,421. Patented June 6, 1911.

UNITED STATES PATENT OFFICE.

FRANK O'NEILL, OF ZANESVILLE, OHIO, ASSIGNOR TO O'NEILL BOTTLE MACHINE COMPANY, OF TERRE HAUTE, INDIANA, A CORPORATION OF INDIANA.

METHOD OF AND APPARATUS FOR MANUFACTURING GLASS BOTTLES.

994,421.  Specification of Letters Patent.  Patented June 6, 1911.

Application filed May 27, 1909. Serial No. 498,701.

*To all whom it may concern:*

Be it known that I, FRANK O'NEILL, a resident of Zanesville, in the county of Muskingum and State of Ohio, have invented certain new and useful Improvements in Methods of and Apparatus for Manufacturing Glass Bottles, of which the following is a specification.

This invention relates to the manufacture of glass bottles, and the apparatus as here embodied for practicing the same is of the general type employing a blank or parison mold open at one end to receive molten glass, such mold coöperating with a neck mold in which the mouth or neck of the bottle is shaped. In this type of machine, the open end of the blank mold is uppermost when it receives the molten glass and the latter flows down into the neck mold and the neck finishing operation is accomplished while the parts are in this position. Thereafter, the molds are reversed, placing the blank mold beneath the neck mold, with the blank mold removed from the glass blank and the latter in position to coöperate with a blow mold in which the shaping of the bottle is completed.

The present invention is directed to various features of the bottle making operation. One of these features is the elongation of the blank within the blow mold just previous to the blowing operation. The length of the blank is thus made coextensive with the depth of the blow mold and the expansion resulting from such blowing is all in a lateral direction. Heretofore, with the blank shorter than the blow mold, the blast or bolt of air admitted into the blank has in many instances tended to force its way through the unsupported lower end of the blank and ruin the same. The blank is preferably elongated by a downwardly drawing suction action.

A further purpose is to provide an improved rotatable mounting for the blank and finishing or neck mold carrier, together with efficient means for rotating the same to invert such molds.

A further object is to provide improved means for manipulating the press mold sections whereby they are opened or separated from the blank by the inverting operation and placed out of the way of the blow mold.

Another object is to provide improved means for moving the blow mold to and from operative position. In the present embodiment, means are provided for raising the blow mold, and projecting upwardly through the bottom thereof a suction device which engages and draws down the blank to the full depth of the blow mold, as above indicated.

The invention includes various structural improvements not above enumerated, such as valve adjusting devices, valve opening and closing devices, etc., all of which are fully described hereinafter.

In the accompanying drawings.

Referring to the drawings, 2 designates a post or column which supports the various mechanisms, and is here arranged on a table 3 which is rotatable on the portable stand 4, the object being to assemble several complete mechanisms on the same column and have them rotatable so that they may be used successively and thus increase the production. However, only one complete mechanism is here shown as that is sufficient for illustrating the invention, no novelty being claimed for providing a series of successively acting mechanisms.

Referring first to the upper portion of the machine, carrier 5 is provided with a tapered or plug-like spindle 6 rotatable in bearing 7 projecting from post 2. Mounted on the carrier is the sectional neck mold 8, the sectional blank or parison mold 9, and mechanism for opening and closing the last mentioned mold. A gear wheel 10 on spindle 6 engages rack-bar 11, the latter carried by a piston operating in cylinder 12, the cylinder supported by and elevated from column 2, as shown. Hand valve 13 controls the movement of the piston within the cylinder, as will be presently explained.

The hand operated blow mold 14 is supported in the vertical plane of molds 8 and 9 by table 15, the latter being slidable vertically in guideway 16 of column 2. The table is moved vertically and the blow mold thus raised and lowered by means of a rod 17 having its piston working in cylinder 18 at the base of the machine. The operating air for this cylinder is controlled by valve 19, as will presently be described.

The suction mechanism for elongating the blank within the blow mold preceding the blowing operation consists of a cylinder 20, having secured to its piston 21 the tubular piston rod 22 which operates through an aperture in table 15 and the bottom of mold 14. The upper end of the tube 22 is contracted by a plug 23, leaving only a comparatively small annular slot 24 for the suction action. A suction or exhaust tube 25 is secured to piston 21 and communicates with tube 22. Tube 25 reciprocates through the lower head of cylinder 20 and may be connected with any suitable exhaust means for creating a suction at slot 24.

The admission of air at opposite ends of cylinder 20 for raising and lowering piston 21 is controlled by valve 26, having an arm 27 which is engaged and the valve oscillated by stops 28 and 29 encountered during the up and down travel of table 15.

Figure 1:
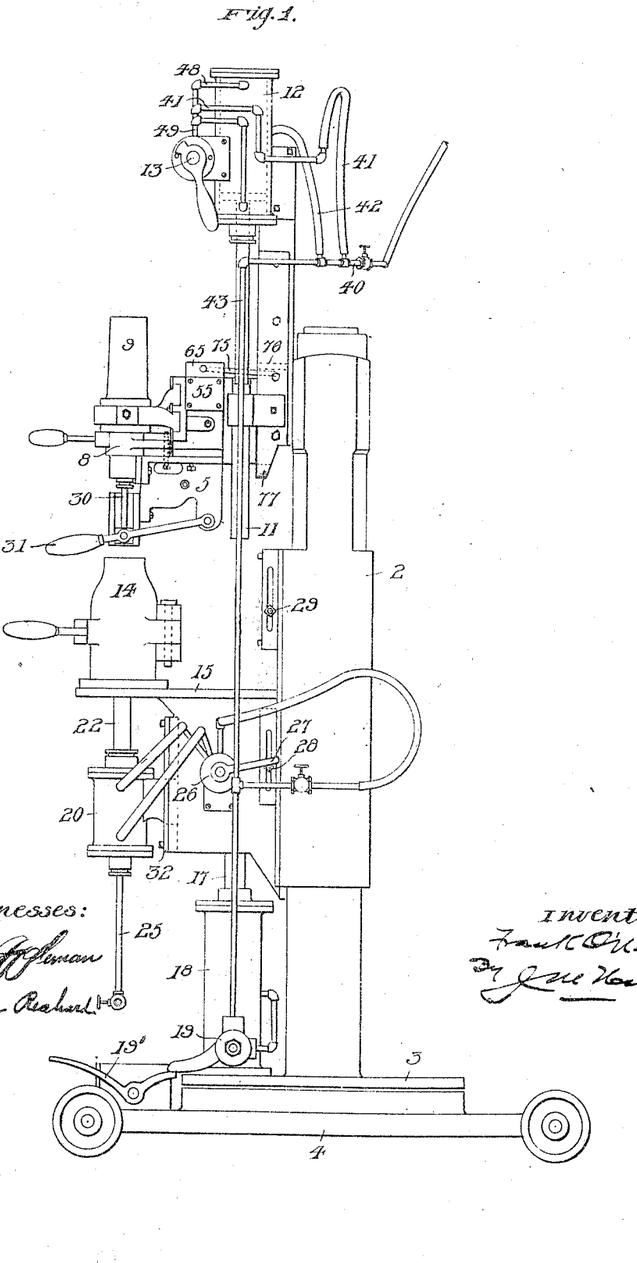
Figures 1 and 2 are elevations of a machine for practicing the invention, taken at opposite sides thereof, and with the mechanisms in initial or starting position.
Figure 2:
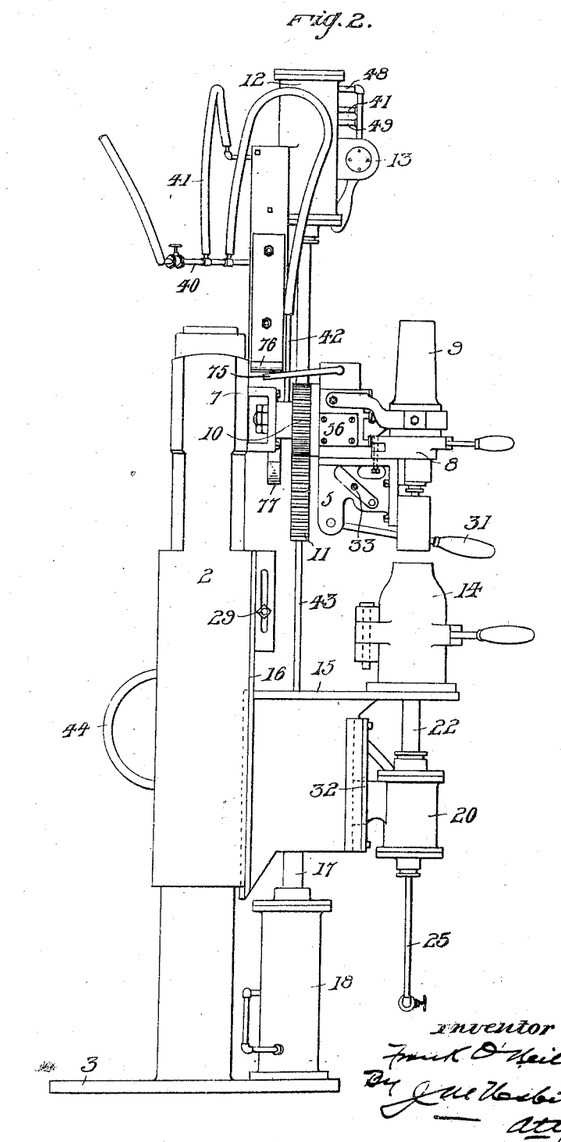
Figure 6:
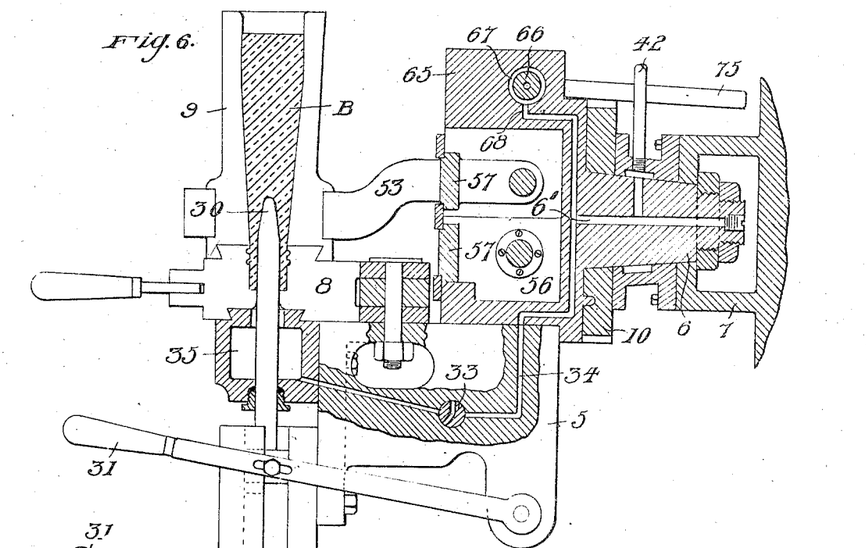
Figs. 6 and 7 are vertical cross-sections of the rotatable carrier which supports the parison and neck molds, both views being taken on line X—X of Fig. 8, in Fig. 6 the parison mold being in upright position and the plunger projected upwardly into the glass blank, while in Fig. 7 said molds are inverted, the parison mold is opened away from the blank as in Fig. 3, and the plunger is shown withdrawn from the blank, with the latter suspended from the neck mold ready to be embraced by the blow mold.
Figure 7:
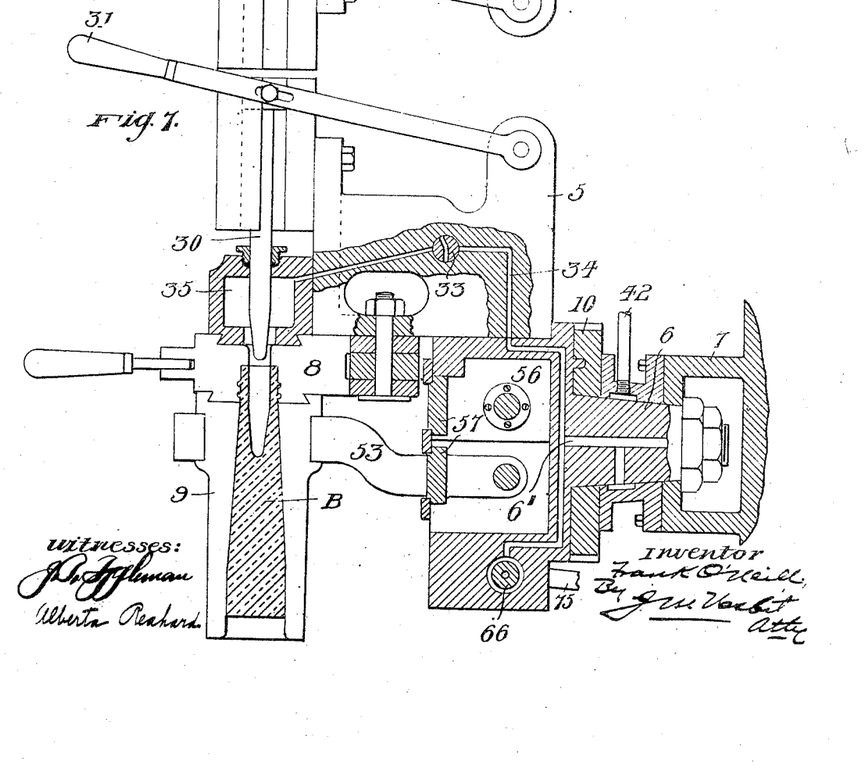
Figure 8:
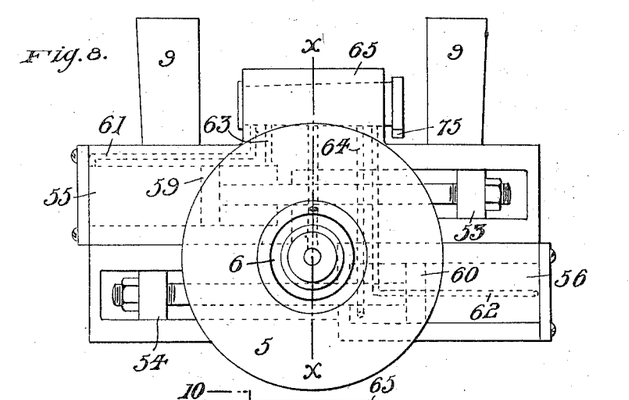
Fig. 8 is a rear elevation of the rotatable mold carrier detached from its bearing or support.
Figure 9:
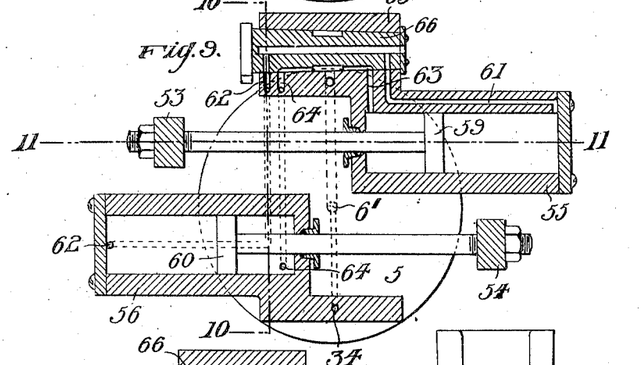
Fig. 9 is a vertical section of the carrier and the cylinders for operating the parison mold, the same taken on line 9—9 of Fig. 11.
Figure 10:
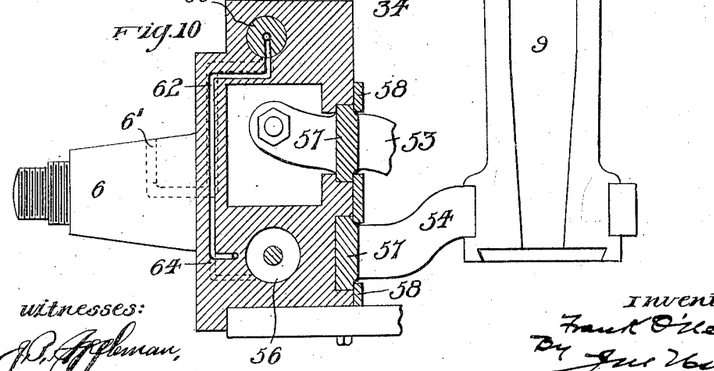
Fig. 10 is a cross-section on line 10—10 of Fig. 9.

The operation of the machine is as follows:—The requisite quantity of glass is dropped in the parison mold 9 when the latter is in position with its open end uppermost, as in Figs. 1, 2 and 6, the molten glass settling into neck mold 8. Thereupon a plunger 30 is forced upward through the neck mold and into the glass, the plunger being connected to hand lever 31 pivoted to carrier 5. This operation forces the glass into the configuration cavities of the neck mold and gives to the mouth or neck its permanent shape, and at the same time forms a starting hollow or depression for the air subsequently admitted to the blank for blowing it. Upon withdrawing plunger 30 by the lowering of lever 31, the positions of molds 8 and 9 are reversed by operating hand valve 13, thereby reciprocating rack bar 11 and turning carrier 5 and the molds from the position shown in Fig. 6 to that of Fig. 7. This operation results in opening mold 9 and moving the sections thereof laterally from the blank B, as in Fig. 3. The action is such that when the molds reach the position shown in Fig. 7, mold 9 has been fully opened and there is nothing to impede the upward movement of the blow mold. This movement is accomplished by manipulating valve 19 which results in raising table 15 and placing the upper end of the blow mold in engagement with neck mold 8, as in Fig. 3, the blow mold being open at such time so as to freely embrace blank B, but is closed immediately upon being raised. When table 15 moves upward, piston 21 and suction tube 22 are in the elevated position shown in Fig. 3, so that such upward movement places the upper contracted end of tube 22 in engagement with the lower extremity of blank B, and the suction through slot 24 causes the glass to adhere to the tube and lower therewith. This lowering movement is accomplished by arm 27 of valve 26 engaging stop 29 upon completion of the upward travel of table 15 and the blow mold, this turning of valve 26 admitting air above piston 21 and exhausting the air from below the latter, thus lowering the piston and tube 22 into the position shown in Figs. 5 and 6 with the upper end of the latter countersunk in the mold bottom. The travel or throw of piston 21 may be regulated by adjusting cylinder 20 vertically beneath clamp plates 32 which secure it to the table structure. The blank is thus elongated to the full depth of the blow mold and is so suspended that there is no danger of the blast or bolt of air puncturing the bottom of the blank, as is liable to occur when the blank is unsupported from below. Various means may be employed for thus depressing or elongating the blank, and it is obvious that this may be done by a sucking or air exhausting operation performed in different ways. With the blank thus distended and its lower end supported, hand valve 33 is operated to form a continuous port 34 from the center of spindle 6 to cavity 35 of carrier 5, from which the air flows into the recessed mouth or neck of the blank and distends the latter in the blow mold. Only a momentary blast or bolt is necessary, the operator manipulating valve 33 for this purpose, as required. Upon completion of the blowing operation the neck mold 8 and the blow mold are opened and the bottle removed. Following this, table 15 is lowered by manipulating valve 19, whereupon the carrier 5 supporting the blank and neck molds is free to oscillate, this being accomplished through the medium of valve 13, placing the parison mold 9 again in upright position, such return movement operating to close said mold, as will presently appear. Thus the parts are restored to their several starting positions for repeating the bottle-forming operation. Where several sets of mechanism are grouped on a revoluble table, as hereinbefore suggested, such sets may be presented to the operator progressively, so that the first or starting operation may be proceeded with in one set before the operation is fully completed by the preceding set, thus greatly expediting the work.

The compressed air for the several cylinders, also for the blowing operation is supplied through pipe 40. A pipe 41 connected to the latter supplies air to valve 13 which controls cylinder 12. Another extension 42 from pipe 40 leads through bearing 7 to the spindle 6 ported at 6' to furnish air for the blowing operation and to open and close mold 9. A downward extension 43 of pipe 40 leads to valve 19 which controls cylinder 18, and a branch 44 from pipe 43 is connected to valve 26 which controls cylinder 20.

Figures 3, 4, 5, 14, 15, 16:
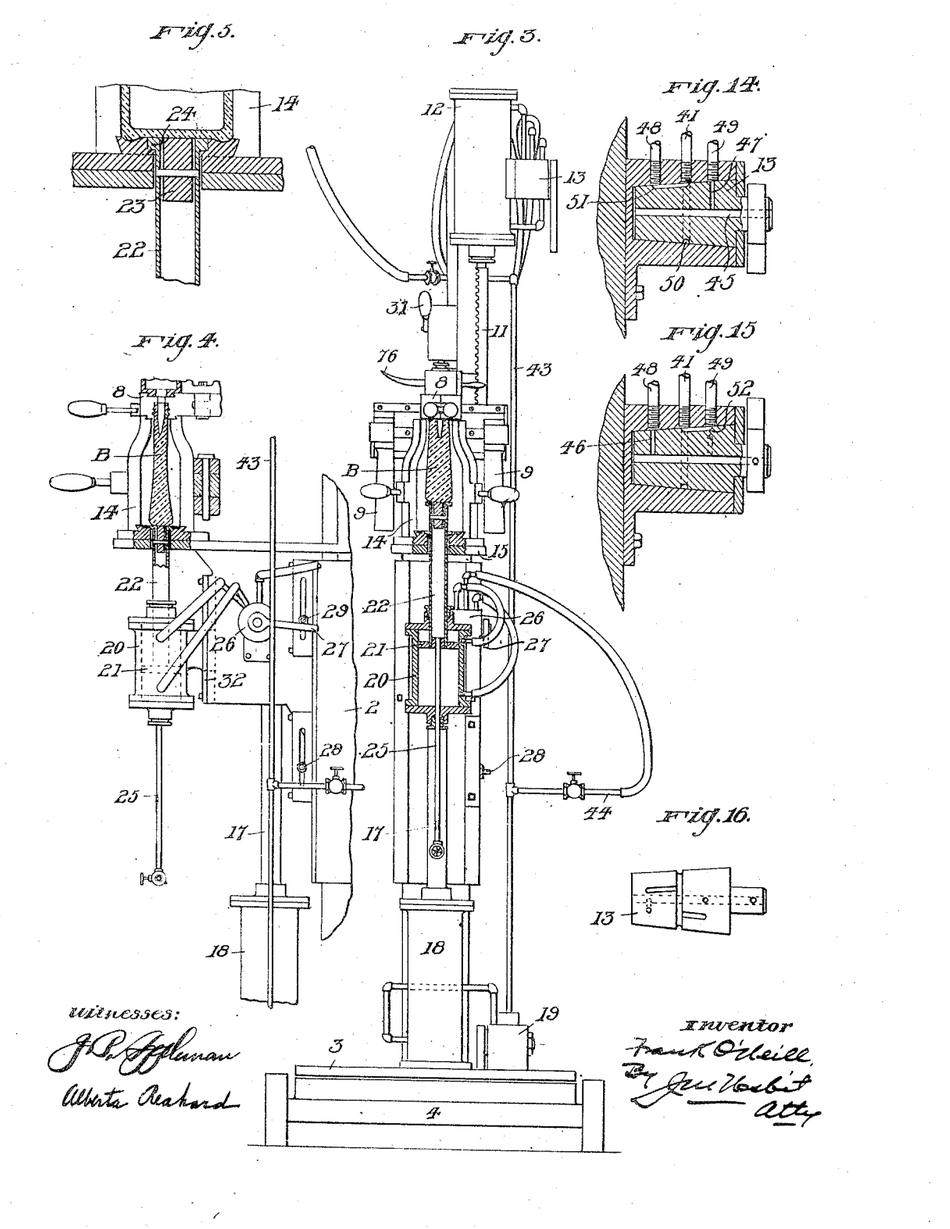
Fig. 3 is a sectional elevation, showing the parison and neck molds inverted from the positions in Figs. 1 and 2, and with the blow mold raised to position to close around the blank suspended from the neck mold, the parison mold being always open when inverted, as in this view.
Fig. 4 is a side elevation of a portion of the mechanism, showing half of the blow mold in the position of Fig. 3, and in Fig. 4 the suction device being shown lowered with the blank drawn downward, while in Fig. 3 the suction device is raised to engage the suspended blank.
Fig. 5 is a detail on a larger scale of the suction device and the lower end of half of the blow mold.
Figs. 14, 15 and 16 are details of the valve for the uppermost cylinder which controls the movement of the rack reciprocating piston.

Valve 13 is shown in detail in Figs. 14, 15 and 16. It is of plug form and provided with a central exhaust port 45 having lateral branches 46 and 47 which register alternately with pipes 48 and 49 extending to opposite ends of cylinder 12, thereby exhausting one end or the other, as the case may be. Encircling valve 13 in the plane of air inlet pipe 41 is a groove 50 having lateral branches 51 and 52, the former adapted to register with pipe 48, and the latter with pipe 49 to pass air into opposite ends of the cylinder 12. The arrangement is such that when the valve is turned to admit air into one end of the cylinder the opposite end is connected to the exhaust.

Valve 26 is constructed like valve 13 and connected in like manner to the opposite ends of cylinder 20, and hence has not been shown in detail. Valve 19 is a plug valve of usual form and is ported to just one-half the extent of valve 13, as it is necessary to admit and exhaust air at the lower end only of cylinder 18, table 15 lowering by gravity from blowing position. Valve 19 may be operated by foot treadle 19'. As no novelty is claimed herein for these valves 26 and 19, nor for treadle 19', the illustration is deemed sufficient.

The mechanism for opening and closing mold 9 will now be described. One of the half sections of this mold is supported by an arm 53, and the other half by similar arm 54. These arms are shaped to lie in different vertical planes, as clearly shown in Figs. 6 and 7, and are extended backward into the portion of carrier 5 equipped with two cylinders 55 and 56, one above and out of line with the other, so that the arms may move freely. Each of the arms carries a plate-like guiding extension 57 which moves in slideways 58 extending longitudinally of and beyond the respective cylinders, thereby securing accuracy in the opening and closing movements and preventing the pistons from cramping in the cylinders.

Arm 53 is connected to piston 59 of cylinder 55, and arm 54 is connected in like manner to piston 60 of cylinder 56. Ports lead from a valve chamber 65 to opposite ends of each of these cylinders, as shown in Figs. 8 and 9, 61 and 62 being the ports leading to the outer ends of the cylinders 55 and 56, respectively, and ports 63 and 64 to their inner ends. The elongated plug valve 66 operative in chamber 65, has the central encircling groove 67 in constant communication with air inlet port 34 in carrier 5, as indicated at 68, Fig. 6. Grooves 69 in valve 66 lead from groove 67 outwardly to register with ports 61 and 62, while similar but shorter grooves 70 are likewise arranged to connect groove 67 with ports 63 and 64 leading to the inner ends of the cylinders. Thus with valve 66 turned to one position, air is admitted simultaneously to the inner ends of the cylinders and forces their pistons outward, thereby closing together the sections of mold 9, and in another position of the valve air is similarly admitted to the outer end of the cylinders, forcing their pistons inward and opening the mold.

An exhaust port 71 is formed through the longitudinal center of valve 66, and has branches 72 adapted to register with cylinder ports 61 and 62, and similar branches 73 for cylinder ports 63 and 64. Thus, with the valve turned to one position the inner ends of both cylinders 55 and 56 are open to the exhaust, and their opposite ends to the inlet, while in another position of the valve the outer ends of the cylinders exhaust and their inner ends are open to the air inlet.

Figures 11, 13:
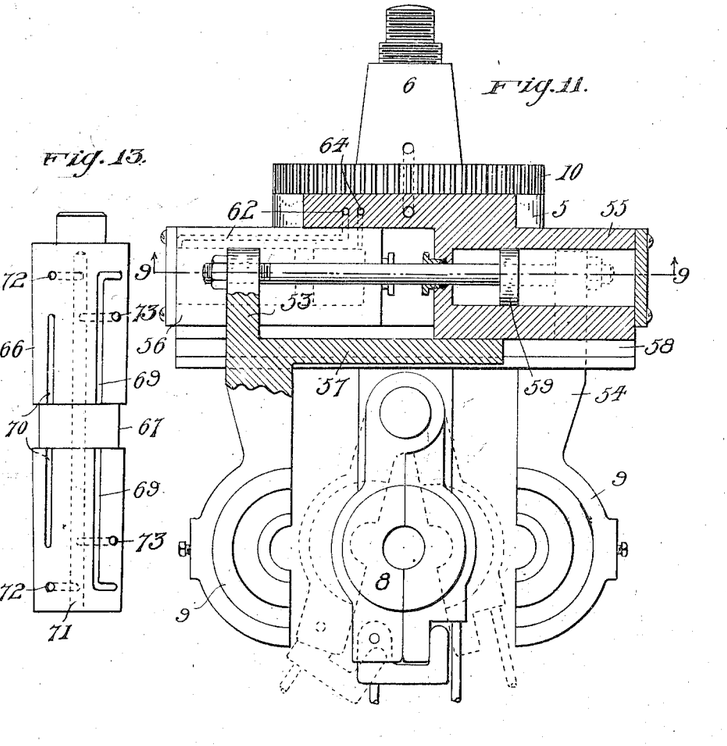
Fig. 11 is a plan of the carrier and the parison and neck molds, the cylinder portion of the mechanism being in section on line 11—11 of Fig. 9.
Fig. 13 is a detail of said valve.
Figure 12:
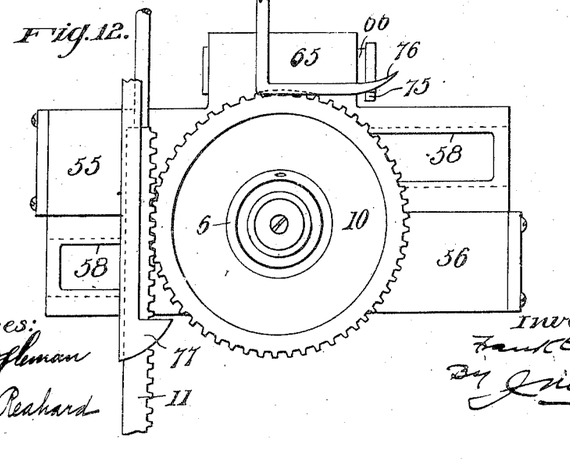
Fig. 12 is a view similar to Fig. 8, showing the gear wheel for rotating the carrier, and the fixed stops for operating the valve which controls the cylinders and pistons for opening and closing the parison mold.

For automatically operating valve 66 by the turning of carrier 5, the stem of the valve is provided with an arm 75 which coöperates with the curved or beveled fixed stops 76 and 77 which project into the path traveled by arm 75 when the carrier is turned to invert molds 8 and 9. When mold 9 is uppermost, as in Figs. 1, 2, 6 and 10, the valve arm is in engagement with and has been moved by stop 76 so as to exhaust the outer ends of cylinders 55 and 56 and admit air to their inner ends, thus holding mold 9 closed. Upon returning carrier 9 to reverse the molds from the position of Fig. 6 to that of Fig. 7, arm 75 engages stop 77 and so turns the valve as to exhaust the inner ends of the cylinders and admit air to the outer ends, thus opening mold 9 as in Figs. 3 and 11, the mold sections moving away from blank B and affording room for blow mold 14 to move upward, as in Fig. 3. The opening and closing of mold 9 is thus taken care of automatically by the turning of carrier 5, and no attention on the part of the operator is necessary in this regard.

While the several structural details have been described with considerable particularity, I do not limit myself thereto, as mechanism for practicing the invention may be variously employed without departing from the spirit and scope of the appended claims.

I claim:—

1. A method of manufacturing glass bottles consisting in producing a non-tubular blank shorter than the bottle formed therefrom, then distending the non-tubular blank in the direction of its length by suction acting on the exterior thereof, and then distending the blank laterally by blowing.

2. A method of manufacturing glass bottles consisting in producing a blank shorter than the bottle formed therefrom, then distending the blank only in the direction of its length by suction acting on the exterior thereof, and then distending the blank laterally.

3. A method of manufacturing glass bottles consisting in producing a blank shorter than the bottle formed therefrom, holding one end of the blank fixed and simultaneously elongating the same by suction acting on the exterior of the opposite end of the blank, and distending the blank laterally.

4. A method of manufacturing glass bottles consisting in producing a blank shorter and of less cross-sectional area than the formed bottle, holding the blank at one end and simultaneously elongating it by means acting on the exterior of its opposite end without marring the same, and then distending the blank laterally.

5. A method of manufacturing glass bottles consisting in producing a blank shorter and of less cross-sectional area than the forming cavity of a blow mold, supporting the blank at one end within such mold, and simultaneously elongating the supported blank by means acting on the exterior of its opposite end without marring the same, and distending the blank laterally.

6. A method of manufacturing glass bottles consisting in producing a blank shorter than the bottle formed therefrom, holding one end of the blank fixed and fully elongating the blank by suction force acting only on the opposite end thereof and without distending the blank laterally, and then distending the blank laterally after it is fully elongated.

7. In the manufacture of glass bottles, means for forming a blank shorter than the finished bottle, and movable suction means engaging only the exterior surface of the blank for elongating it to the length of the bottle subsequently formed therefrom.

8. In the manufacture of glass bottles, means for forming a blank shorter than the finished bottle, means for holding one end of the blank, and a movable suction device engaging only the external surface of the opposite end of the blank for elongating the latter to the length of the bottle subsequently formed therefrom.

9. In the manufacture of glass bottles, means for forming a blank shorter and of less cross-sectional area than the cavity of a mold in which the bottle is formed, suction means movable longitudinally of the blank and engaging only the exterior surface thereof, a mold, means for distending the blank laterally, and mechanism operative in advance of the laterally distending means for actuating the suction means, thereby distending the blank longitudinally before distending it laterally.

10. In a bottle making machine, a carrier, means for inverting the carrier, sectional parison and neck molds on the carrier, automatic means for opening the parison mold acting only when said mold is in its lowermost position, a blow mold, and blowing means.

11. In a bottle making machine, a carrier, means for inverting the carrier, sectional parison and neck molds on the carrier, means made active by the carrier only when the parison mold is in its lowermost position for opening said mold, a blow mold, and blowing means.

12. In a bottle making machine, a neck mold having indentations which shape the neck and also retain the neck-end of the blank, a blow mold embracing the blank, non-marring means movable within the blow mold and engaging only the exterior of the blank for elongating the same, and blowing means.

13. In the manufacture of glass bottles, a neck mold, means shaping one end of a blank therein with the blank held by and extending from the neck mold and shorter than a blow mold, a blow mold inclosing the blank, suction means acting only on the exterior of the opposite end of the blank for elongating the same while thus inclosed, and blowing means.

14. In a bottle making machine, a carrier, means for inverting the carrier, a sectional parison mold and a neck mold in operative relation to each other on the carrier, cylinders and pistons in the cylinders connected to the sections of the parison mold for opening and closing the latter, a valve controlling the cylinders, two valve actuating devices by which the valve is moved into operative relation by the carrier, one of said devices moving the valve to open the parison mold when in lowermost position, a blow mold, means for placing the blow mold the neck mold and the blank in operative relation, and blowing means.

15. In a bottle making machine, a carrier mounted to oscillate on a horizontal axis, a power cylinder, a rack and gear connection between the cylinder piston and the carrier for turning the latter, a sectional parison mold and a neck mold on the carrier, means for opening the parison mold, a blow mold, means for placing the blow mold the neck mold and the blank in operative relation after the parison mold has been opened, and blowing means.

16. In a bottle making machine, a carrier, means for inverting the carrier, a sectional parison mold and a neck mold on the carrier with the parison mold above the neck mold at the beginning of the operation, a plunger, means for moving the plunger into the neck mold, automatic means for moving the sections of the parison mold away from the blank after the carrier has been inverted, a blow mold, means for placing the blow mold the neck mold and the blank in operative relation after the parison mold has been opened, and blowing means.

17. In a bottle making machine, a carrier, a spindle projecting from the carrier, a bearing in which the spindle turns, a sectional parison mold and a neck mold mounted on the carrier, cylinders on the carrier having their pistons connected to the parison mold sections for opening and closing the latter, a valve on the carrier controlling said cylinders, the carrier and the carrier spindle ported to conduct air to the valve and also to provide air for blowing, a blow mold, means for placing the blow mold the neck mold and the blank in operative relation after the parison mold has been opened, and blowing means.

18. In a bottle making machine, a sectional parison mold, a neck mold, a blow mold and means for placing the blow mold the neck mold and the blank in operative relation after the parison mold has been opened, a suction device and means for moving the same vertically to engage and elongate the blank to the depth of the blow mold, and blowing means.

19. In a bottle making machine, a sectional parison mold, a neck mold, a blow mold and means for placing the blow mold the neck mold and the blank in operative relation after the parison mold has been opened, a suction device raised through the bottom of the blow mold and engaging the lower end of the blank when the blow mold is moved into operative position, means for depressing the suction device and thereby elongating the blank to the depth of the blow mold, and blowing means.

20. In a bottle making machine, a neck mold, means suspending a glass blank from the neck mold with the upper end of the blank confined therein, the length of the blank being less than the depth of the blow mold, a blow mold, means for placing the blow mold the neck mold and the blank in operative relation, means operative after thus placing the blow mold and prior to the blowing operation for elongating the blank to the depth of the blow mold, and blowing means.

21. In a bottle making machine, a neck mold, means suspending a glass blank from the neck mold with the upper end of the blank confined therein, the length of the blank being less than the depth of the blow mold, a blow mold movable into operative relation with the neck mold and blank, a suction device movable vertically in the bottom of the blow mold and means movable with the blow mold for raising and lowering the suction device, the latter operating to elongate the blank within the blow mold, and blowing means.

22. In a bottle making machine, a neck mold, means suspending a glass blank from the neck mold with the upper end of the blank confined therein, the length of the blank being less than the depth of the blow mold, a blow mold movable vertically into operative relation with the neck mold and blank, a suction device movable through the bottom of the blow mold for engaging and elongating the blank, a cylinder and piston movable vertically with the blow mold with the suction device secured to said piston, a valve control for said cylinder, and blowing means.

23. In a bottle making machine, a neck mold, means suspending a glass blank from the neck mold with the upper end of the blank confined therein, the length of the blank being less than the depth of the blow mold, a vertically movable table, a cylinder and piston for raising and lowering the table, a blow mold on the table and moved thereby into operative relation with the neck mold and the blank, a cylinder and piston beneath and movable with the table, a suction tube secured to said piston and movable vertically through the bottom of the blow mold for engaging and elongating the blank within the blow mold, a valve controlling the movement of said piston, two fixed stops engaged by the valve and moving the latter during the travel of the table, the lowermost stop moving the valve to raise the piston and project the tube into the blow mold and the uppermost stop reversing the valve and lowering the piston and depressing the tube and blowing means.

In testimony whereof I affix my signature in presence of two witnesses.

FRANK O'NEILL.

Witnesses:
  NINA L. SOUDERS,
  JAMES M. BAILEY.